(12) United States Patent
Fuderer et al.

(10) Patent No.: US 7,419,035 B2
(45) Date of Patent: Sep. 2, 2008

(54) BRAKE APPLICATION DEVICE COMPRISING AN ELECTRICALLY ACTUATED WEAR-ADJUSTING EMERGENCY RELEASE AND AUXILIARY RELEASE DEVICE

(75) Inventors: Erich Fuderer, Fürstenfeldbruck (DE); Peter Wolfsteiner, München (DE); Thomas Wagner, München (DE); Manfred Vohla, Vienna (DE); Josef Staltmeir, München (DE); Ulf Friesen, München (DE)

(73) Assignee: Knorr-Bremse Systeme für Schienenfahreuge GmbH, Munich (DE)

( * ) Notice: Subject to any disclaimer, the term of this patent is extended or adjusted under 35 U.S.C. 154(b) by 73 days.

(21) Appl. No.: 10/510,037

(22) PCT Filed: Mar. 31, 2003

(86) PCT No.: PCT/EP03/03313

§ 371 (c)(1),
(2), (4) Date: Mar. 17, 2005

(87) PCT Pub. No.: WO03/082649

PCT Pub. Date: Oct. 9, 2003

(65) Prior Publication Data

US 2005/0155825 A1    Jul. 21, 2005

(30) Foreign Application Priority Data

Apr. 3, 2002   (DE) ................................ 102 14 671

(51) Int. Cl.
  *F16D 55/02*   (2006.01)
(52) U.S. Cl. .................. 188/71.9; 188/72.1; 188/196 V
(58) Field of Classification Search ............. 188/196 D, 188/196 V, 72.1, 72.7–72.9, 1.11 L, 71.7, 188/196 BA
See application file for complete search history.

(56) References Cited

U.S. PATENT DOCUMENTS

| 3,955,480 | A |   | 5/1976  | Wosegien          |            |
|-----------|---|---|---------|-------------------|------------|
| 4,005,767 | A |   | 2/1977  | Farello           |            |
| 4,006,801 | A |   | 2/1977  | Bayliss           |            |
| 4,018,140 | A |   | 4/1977  | Engle             |            |
| 4,113,070 | A |   | 9/1978  | Paginton          |            |
| 4,234,062 | A |   | 11/1980 | Kerscher et al.   |            |
| 4,431,089 | A | * | 2/1984  | Nadas et al. ..........  | 188/196 D |

(Continued)

FOREIGN PATENT DOCUMENTS

| DE | 33 26 374 A1 |   | 1/1985 |
|----|--------------|---|--------|
| DE | 3423510      |   | 1/1986 |
| DE | 197 31 696   |   | 2/1999 |
| DE | 19945701     |   | 4/2001 |
| EP | 0699846      | * | 3/1996 |

OTHER PUBLICATIONS

Germany Office Action Dated Jan. 27, 2006 (4 pages).

*Primary Examiner*—Christopher P Schwartz
(74) *Attorney, Agent, or Firm*—Barnes & Thornburg LLP

(57) ABSTRACT

A brake application device for vehicles, especially for rail vehicles, comprising a wear-adjusting device which is embodied in a brake actuator and comprises a helical gear which is provided with a threaded spindle and a nut as screw connection parts, said nut being screwed onto said threaded spindle. One of the screw connection parts of the helical gear is electrically driven in order to adjust the wear of the brakes and the other screw connection part of the helical gear for the emergency release and/or auxiliary release of the brakes.

18 Claims, 2 Drawing Sheets

U.S. PATENT DOCUMENTS

| | | | |
|---|---|---|---|
| 4,546,297 A * | 10/1985 | Washbourn et al. | 318/372 |
| 4,557,355 A * | 12/1985 | Wilke et al. | 188/173 |
| 4,592,451 A | 6/1986 | Persson | |
| 4,651,852 A * | 3/1987 | Wickham et al. | 477/4 |
| 4,760,895 A * | 8/1988 | Wickham | 185/40 R |
| 4,809,824 A * | 3/1989 | Fargier et al. | 188/72.8 |
| 4,895,227 A | 1/1990 | Grenier et al. | |
| 5,086,884 A * | 2/1992 | Gordon et al. | 188/71.9 |
| 5,246,091 A | 9/1993 | Brooks, Sr. | |
| 5,348,123 A * | 9/1994 | Takahashi et al. | 188/72.1 |
| 5,799,757 A * | 9/1998 | Akamatsu et al. | 188/76 |
| 6,012,556 A * | 1/2000 | Blosch et al. | 188/71.8 |
| 6,250,434 B1 | 6/2001 | Baumgartner et al. | |
| 6,276,497 B1 * | 8/2001 | Severinsson | 188/72.7 |
| 6,325,182 B1 * | 12/2001 | Yamaguchi et al. | 188/72.8 |
| 6,405,836 B1 | 6/2002 | Rieth et al. | |
| 6,431,329 B1 | 8/2002 | Hyber et al. | |
| 6,684,989 B2 | 2/2004 | Berra et al. | |
| 6,722,477 B1 * | 4/2004 | Wolfsteiner et al. | 188/72.9 |
| 6,837,342 B1 * | 1/2005 | Olschewski et al. | 188/72.8 |
| 6,840,354 B2 | 1/2005 | Grundwurmer et al. | |
| 2004/0074709 A1 | 4/2004 | Krug et al. | |
| 2005/0155825 A1 | 7/2005 | Fuderer et al. | |
| 2006/0070830 A1 | 4/2006 | Fuderer et al. | |

* cited by examiner

BRAKE APPLICATION DEVICE COMPRISING AN ELECTRICALLY ACTUATED WEAR-ADJUSTING EMERGENCY RELEASE AND AUXILIARY RELEASE DEVICE

BACKGROUND AND SUMMARY OF THE DISCLOSURE

The disclosure is based on a brake application system for vehicles, particularly for rail vehicles, containing a wear adjuster as part of a brake actuator having a helical gear which is provided with a threaded spindle and a nut to be screwed to the threaded spindle, as the screw connection parts.

A brake application system of this type is known from European Patent Document EP 0 699 846 A2. The wear adjuster for rail vehicle brakes in the form of tie rod and plunger rod adjusters which, in the case of a brake pad and brake disc wear, keep the brake pad play constant. This takes place by a change of length of the helical gear, in the case of plunger rod adjusters, an increasing adjuster length causing a reduction of the brake pad play. The drive of the known helical gear operates mechanically by a brake linkage with a plunger rod which, in the event of an excess stroke of a brake actuator constructed as a pneumatic cylinder—piston driving gear, is operated by a rocket lever. An emergency release of the brake acted upon by braking power takes place by the pneumatic brake actuator. For the auxiliary release in the case of a brake pad exchange, the threaded spindle is rotated manually.

The present brake application system includes one screw connection part of the helical gear being electrically driven for the wear adjustment and the other screw connection part of the helical screw being electrically driven for the emergency and/or auxiliary release of the brake.

As a result of the electric drive of the one screw connection part of the helical gear for the wear adjustment, the known brake linkage can be eliminated. Since the electric drive unit has a smaller size than the brake linkage, space and weight are saved. The electric control lines can be integrated in a simple manner in different vehicle models and can be laid in a space-saving manner. Furthermore, as a result of the electric operation in comparison to a mechanical operation, a more precise adjusting of the brake pad play can be achieved.

In addition, both functions—the wear adjusting, on the one hand, and the emergency and/or auxiliary release, on the other hand—are implemented by one and the same helical gear. Thus, by a combination of functions in one assembly, additional space and weight can be saved. The auxiliary release, which so far had to be carried out separately in a manual manner for each and on each brake application system, is replaced by an electrically remotely operated auxiliary release, for example, from an engineer's cab of the rail vehicle. In particular, all brake application systems of the rail vehicle can be released by a common and one-time control, whereby the maintenance time is reduced.

For the electric actuating of the one screw connection part, an electric drive unit is provided which consists of an electric motor with a gearing arranged on the output side. The gearing output is rotationally coupled with an electrically actuated screw connection part. The electric motor may be a d.c. motor. The gearing contains a planetary gear axially adjoining the electric motor as well as one or more gearwheel stages arranged behind this planetary gearing.

A clutch by which the one screw connection part, in the event of the presence of an axial force originating from a braking, can be non-rotatably coupled with a non-rotatable part, for example, a housing and otherwise can be uncoupled therefrom. As a result, the screw connection part loaded by way of the caliper levers of the brake application system by the braking power is supported on the housing and not on the electric drive unit. Thus, the electric drive unit can be dimensioned to be smaller, which also contributes to a reduction of the size.

A slip clutch is arranged between the electric drive unit and the one screw connection part. The slip clutch is constructed to slip when stop positions are reached and is otherwise coupling. One stop position is formed, for example, by the application of the brake pads on the brake disc. Another stop position is formed by a screw connection end position in which the one screw connection part is screwed to the stop into the other screw connection part or vice-versa. In the latter case, the one screw connection part would be rotated along with the other screw connection part, and the rotating movement would be undesirably transmitted to the electric drive unit. The slip clutch therefore protects the electric drive unit from impacts when the stop positions are reached in that it slides through in order to permit the motor to softly and gradually conclude its rotating movement and uncouples it from torques introduced by way of other components. The slip clutch is preferably connected between the coupling and the electric drive unit.

The electric drive unit of the one screw connection part can be actuated independently of an electric drive unit of the other screw connection part. As a result, the functions combined in one assembly—the wear adjustment, on the one hand, and the emergency and/or auxiliary release, on the other hand—can be carried out individually and independently of one another.

These and other aspects of the present disclosure will become apparent from the following detailed description of the disclosure, when considered in conjunction with accompanying drawings.

DETAILED DESCRIPTION OF THE DRAWINGS

Figure 1:
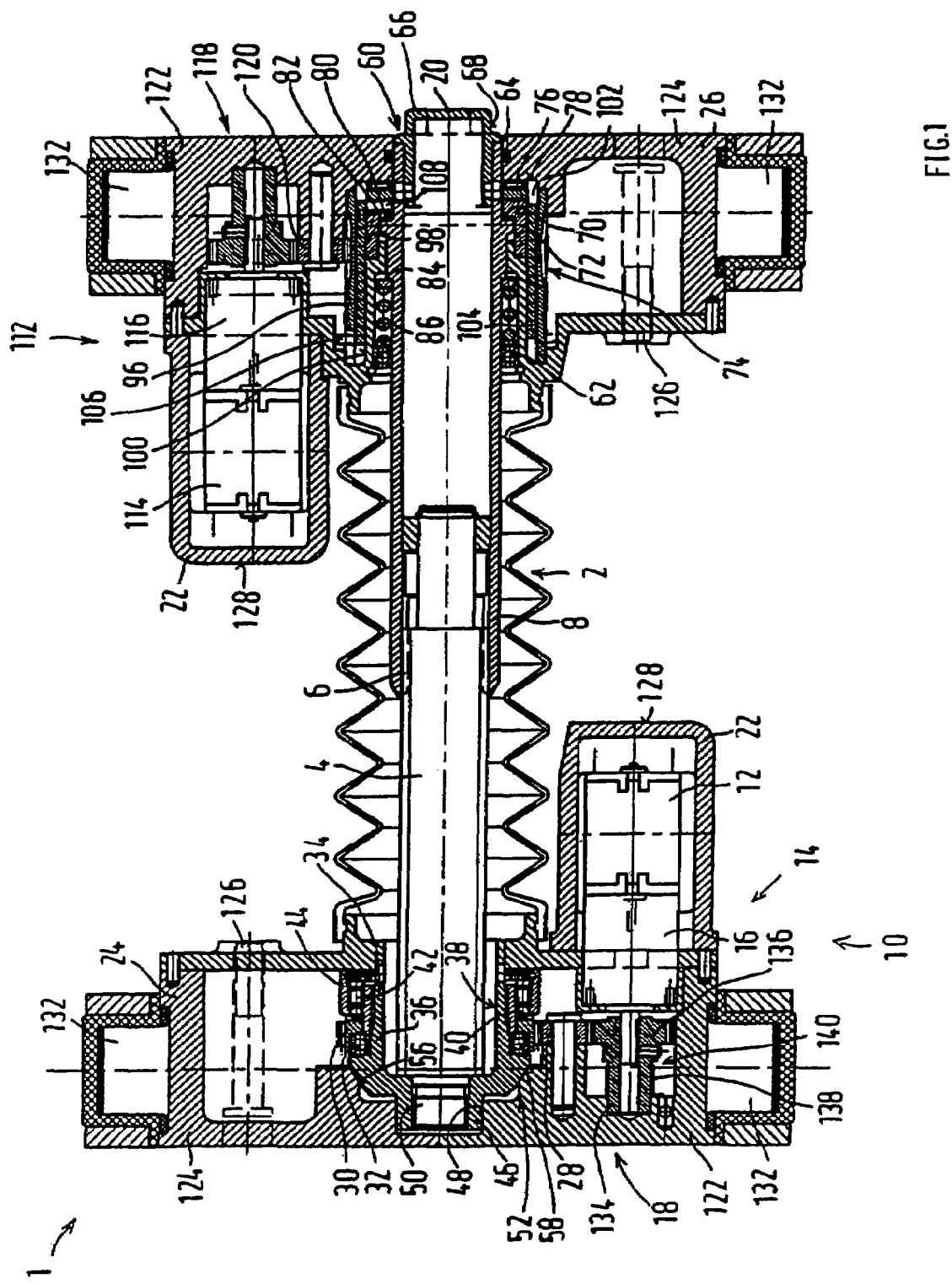
FIG. 1 is a longitudinal sectional view of a plunger rod adjuster of a brake application system of a rail vehicle according to the present disclosure in a position of the maximal length.

For reasons of scale, FIG. 1 shows only a wear adjuster 1 in the form of a plunger rod adjuster as part of an electromechanically, pneumatically or hydraulically operable brake application system which may be used in an urban railway or a subway. The plunger rod adjuster, in the position illustrated in FIG. 1, is in a position moved to the maximal length, which corresponds to a high wear condition of the brake pads.

The plunger rod adjuster 1 contains a helical gear 2 which, as the screw connection parts, has a threaded spindle 4 and a nut 8 which can be screwed onto this threaded spindle 4 by a trapezoidal thread 6 and is constructed as a tube-type part. The trapezoidal thread 6 is not self-locking. For the wear adjustment, the plunger rod adjuster 1 is designed to be operated electrically. An electric drive unit 10 is provided which consists of an electric motor 12 with a gearing 14 connected behind it, whose gearing output is rotationally coupled with the threaded spindle 4. As an alternative, the nut 8 or the threaded spindle 4 and the nut 8 can also be designed to be electrically operated for adjusting the wear.

The electric motor is formed, for example, by a d.c. motor 12, and the gearing 14 is formed by a planetary gearing 16 axially adjoining the d.c. motor 12 as well as by a gearwheel stage 18 connected to the output side of the planetary gearing 16. The d.c. motor 12, the planetary gearing 16 and the gear wheel stage 18 are arranged parallel to and at a radial distance from the center axis 20 of the helical gear 2 and are housed in a drive housing 22 flanged to a housing part 24, shown on the left in FIG. 1, of the plunger rod adjuster 1. A left caliper lever (not shown) of a caliper of the brake application system is linked to the plunger rod adjuster 1. A housing part 26 which, viewed in the axial direction of the helical gear 2, is opposite the left housing part 24 and the right caliper lever of the caliper is linked to this right housing part 26. Such a caliper is sufficiently known and is described, for example, in European Patent Document EP 0 699 846 A2, to whose entire disclosure content reference is made here. The spacing of the left housing part 24 and the right housing part 26 of the plunger rod adjuster 1 is varied by the helical gear 2. By extending the helical gear 2 or the plunger rod adjuster 1, a wear adjustment can take place and the pad play between the brake pads and the brake disc, which enlarges with time, can be reduced again and can be held at a constant value.

Figure 2:
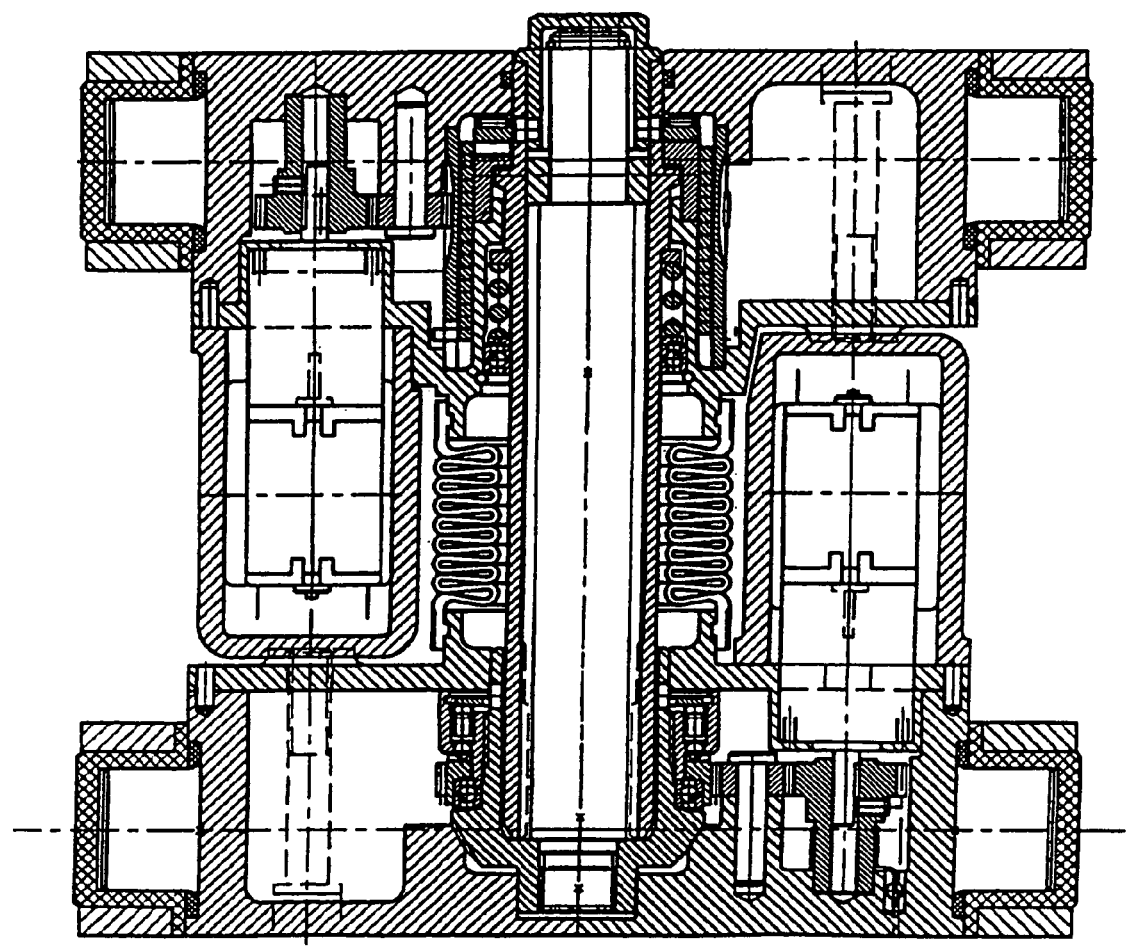
FIG. 2 is a view of the plunger rod adjuster of FIG. 1 in a position of the minimal length.

The gearing-output-side gearwheel 28 of the gearwheel stage 18 meshes with a screw-side gearwheel 30. Gearwheel 28 is coaxially rotatably disposed on a cylindrical projection 34 of a conical sleeve 36 by a deep-groove ball bearing 32. A slip clutch 38 arranged on the side of the screw-side gearwheel 30 pointing to the right housing part 26 couples the electric drive unit 10 with the conical sleeve 36. The slip clutch 38 contains balls 40, which are pretensioned by a defined spring pressure in grooves constructed on the face of the screw-side gearwheel 30 and which are guided in bores 42 of a ring 44 non-rotatably held on the cylindrical projection 34 of the conical sleeve 36. At torques greater than a defined slipping moment, the form closure generated by the balls 40 pressed into the grooves is overcome and the clutch 38 slips, whereby the electric drive unit 10 is uncoupled from the threaded spindle 4. By the appropriate selection of the spring parameters and of the ball—groove geometry, the slipping moment can be adapted to the momentarily existing requirements. In the present case, the clutch 38 slips when the brake application system reaches stop positions, such as the position in which the brake pads come to rest on the brake disc or the position in which the plunger rod adjuster 1 is shortened to the minimal length (FIG. 2) and the threaded spindle 4 is completely screwed into the nut 8.

The driving torque transmitted by the slip clutch 38 to the ring 44 is introduced into the conical sleeve 36. A pin-shaped projection 46 on the end of conical sleeve 36 has a radially outer surface which forms a bearing surface of a slip bearing 48. The bearing surface is slidably and rotatably disposed in a housing-side bearing surface assigned to it. The slip bearing 48 is used as a bearing point of the threaded spindle 4, which bearing point is on the left side in FIG. 1. The threaded spindle 4, in turn, is screwed by and end-side threaded pin 50 into an internal thread existing in the projection 46 of the conical sleeve 36 and is held there in a non-rotatable manner. As a result, the conical sleeve 36 can transmit the driving torque introduced by the slip clutch 38 to the threaded spindle 4.

A cone clutch 52 contains at least two conical surfaces 56, 58, which can be stopped by mutual friction against one another and are arranged in an oblique manner viewed in the axial direction. The cone clutch 52 is in front of the electric drive unit 10, with one of the conical surfaces 56 being constructed on the left housing part 24 and the other conical surface 58 being constructed on the conical sleeve 36 screwed to the threaded spindle 4. When the threaded spindle 4 is axially loaded, the two conical surfaces 56, 58 are pressed against one another in the direction of the conical narrowing. Whereby, the respectively taken-up rotating position of the threaded spindle 4 is fixed by frictional engagement or adherence and the axial load is supported by the left housing part 24. In particular, a transmission of the axial load as a torque to the electric drive unit 10 is prevented. If, in contrast, no axial load is present, the cone clutch 52 is in the released state and the conical sleeve 36, together with the threaded spindle 4, can rotate freely with respect to the left housing part 24.

The tube-type nut 8 projects into a stepped passage opening 60 of the right housing part 26 and is rotatably disposed there by a deep-groove ball bearing 62 but is axially displaceably disposed with respect to its inner race. A sleeve 66 is non-rotatably and axially fixedly held in the end of the nut 8 which points away from the left housing part 24. An outer circumference of the sleeve 66 rests slidingly on a seal 64 received in the passage opening 60 of the right housing part 26. The end of the sleeve 66 projecting out of the passage opening 60 is equipped with an application surface 68 for a screwing tool. A slip clutch 70 couples the nut 8 with a coaxial free-wheel sleeve 71 of a lockable free wheel 74. The lockable free wheel 74 is axially displaceably held on the nut 8 and is supported by a thrust bearing 76 that may be constructed as an axial needle bearing against a radial wall 78 of the right housing part 26. The nut 8 is therefore disposed in a thrust bearing.

The slip clutch 70 may be formed by two side face gearings 80, 82 meshing with one another by spring pressure in the axial direction. One side face gearing 80 is constructed on a radially outer ring collar of the end of the nut 8 projecting into the right housing part 26, and the other side face gearing 82 is constructed on the radially inner circumferential surface of the free-wheel sleeve 72.

A coil spring 86 is supported at one end of the deep-groove ball bearing 62 and at the other end on an outer step 84 of the nut 8. The nut 8 is pretensioned by the coil spring 86 against the free-wheel sleeve 72, so that the two side face gearings 80, 82 are in a mutual engagement. When a slipping moment is exceeded, the two side face gearings 80, 82 are disengaged while the nut 6 is axially displaced in the direction of the left housing part 24, whereby the nut 8 can rotate with respect to the free-wheel sleeve 72. The slipping moment of the slip clutch 70 can be adapted by the suitable selection of the spring parameters and of the side face gearings 80, 82.

In the right housing part 26, an electric drive unit 112 is accommodated for the emergency release and the auxiliary release of the brake application system. "Emergency release" is a braking power reduction of the brake application system acted upon by braking power, for example, in the event of a failure of the brake actuator, and "auxiliary release" is a release of the brake not acted upon by braking power for maintenance work, for example, for changing the brake pads.

The electric drive unit 112 consists of an electric motor, for example, a d.c. motor 114, of a planetary gearing 116 as well as of a gearwheel state 118, so that the two electric drive units 10, 112 preferably have an identical construction. The gearing-output-side gearwheel 120 of the gearwheel stage 118 meshes with a toothed sleeve 96 which is coaxial with the helical gear 2. The toothed sleeve 96 is rotatably accommodated in the right housing part 26 and is radially spaced by an annulus 102 with respect to a housing surface 100 which is flush with the radially outer circumferential surface 98 of the free-wheel sleeve 72 and axially adjoins the circumferential surface 98 of the free-wheel sleeve 72. A coil spring 104 which is coaxial with respect to the center axis 20 of the helical gear 2 and has two pin-type ends 106, 108 bent away oppositely in the radial direction is accommodated in the annulus 102. One end 106 is form-lockingly held in a radial passage bore of the toothed sleeve 96, and the other end 108 is form-lockingly held in a radial passage bore of the free-wheel sleeve 72.

The toothed sleeve 96, the coil spring 104, the free-wheel sleeve 72 and the housing surface 100 together form a lockable free wheel as a coil spring free wheel 74, which couples the electric drive unit 112 with the nut 8. More precisely, the coil spring free wheel 74 rotates the nut 8 by the electric drive unit 112 in a direction against the wear adjustment and locks this rotation when the rotation of the nut 8 is not caused by the electric drive unit 112. The above-described slip clutch 70 is arranged between the nut 8 and the coil spring free wheel 74.

Relative to an imagined point of intersection of the center axis 20 of the helical gear 2 and an imagined vertical center line of the plunger rod adjuster 1, the two electric drive units 10, 112 are arranged essentially point-symmetrically with respect to one another. Also, they point toward one another starting from the end of the threaded spindle 4 or of the nut 8. More precisely, the drive unit 10 for the wear adjustment projects essentially from the drive-side end of the threaded spindle 4 in the direction of the drive unit 112 for the emergency and auxiliary release, and the drive unit 112 projects essentially from the drive-side end of the nut 8 in the direction of the drive unit 10 for the wear adjustment. Both drive units 10, 112 actuate a single helical gear 2 for the combined wear adjustment and emergency or auxiliary release.

The right and the left housing part 24, 26 each consists of housing sections 122, 124 which are essentially symmetrical relative to the center axis 20 of the helical gear 2. The drive units 10, 112 are accommodated in a separate housing section 122. A final position sensor 126 is accommodated in each housing section 124 arranged on opposite sides of the center axis 20 from each other. The final position sensor 126 is situated opposite a face-side surface 128 of the drive housing 22 of the respectively other electric drive unit 10, 112. The final position sensors may be mechanical final position switches 126. They are each actuated by engaging the face-side surface 128 of the drive housing 22 of the opposite drive unit 10, 112 when reaching the position illustrated in FIG. 2, in which the plunger rod adjuster 1 has moved in to the minimal length. The actuated switches 126 supply a signal to a control device, which is not shown, whereupon the respectively actuated drive unit 10, 112 is de-energized. At their ends pointing away from one another, the two housing sections 122, 124 of each housing part 24, 26 are in each case provided with one receiving device 132 for bolts, by which one caliper lever respectively of the caliper is linked to each housing part 24, 26.

Furthermore, a coil spring 138 of another coil spring free wheel 140 is arranged on a cylindrical projection 134 of the planetary-gearing-side gearwheel 136 of the gearwheel stage 18 assigned to the drive unit 10 for the wear adjustment. This coil spring free wheel 140 blocks a rotation of the gearwheel 136 in the direction against the wear adjustment and permits it to run freely in the opposite rotating direction.

As a result of the described construction of the plunger rod adjuster 1, and specifically a single helical gear 2, one screw connection part respectively is coupled with a separate drive unit, which is independent of the other drive unit. The brake pad wear can be corrected, and the brake can be released for emergencies and/or in an auxiliary manner. Specifically, the threaded spindle 4 is coupled with one electric drive unit 10, and the nut 8 is coupled with the other electric drive unit 112.

Based on this background, the method of operation of the plunger rod adjuster 1 is as follows:

The wear adjustment, that is, the reduction of the brake pad play, which exists between the brake pads and the brake disc and which has become too large as a result of wear, takes place in the brake-power-free brake release position. For this purpose, the d.c. motor 12 of the electric drive unit 10 provided for the wear adjustment is controlled for a predetermined time and causes the threaded spindle 4 to rotate in one rotating direction by way of the slip clutch 38 closed in the case of a driving torque which is smaller than the slipping moment. During the rotating movement, the threaded spindle 4 is screwed out of the nut 8 and the plunger rod adjuster 1 is thereby lengthened, which results in a reduction of the brake pad play. FIG. 1 shows the plunger rod adjuster 1 in a position in which it is moved out to its maximal length. Since the helical gear 2 is thereby loaded by only very low axial forces, the cone clutch 52 is in the released position, so that the threaded spindle can rotate freely. The nut-side coil spring free wheel 74 blocks a rotating-along of the nut 8, which is not secured against a rotation per se. Rotation of the nut 8 is transmitted by the slip clutch 70 to the free-wheel sleeve 72 and from there to the coil spring 104 which then pulls tight and establishes a frictionally engaged connection between the free-wheel sleeve 72 and the housing surface 100. Thus, the nut 8 is non-rotatably supported on the right housing part 26.

During a braking, the bearing pressure force resulting from the braking power existing at the brake pads and transmitted by the hinged caliper levers of the caliper to the plunger rod adjuster 1 and acting there in the axial direction, could not be supported on the helical gear 2 because the trapezoidal thread 6 between the threaded spindle 4 and the nut 8 does not have a self-locking construction. As a result, the plunger rod adjuster 1 would be shortened under the influence of the axial pressure force and causes an undesirable loss of braking power. However, the cone clutch 52 closes under the effect of the axial load by the pressing-together of the mutually assigned conical surfaces 56, 58 in a frictionally engaged manner and establishes a non-rotatable connection between the threaded spindle 4 and the left housing part 24. On the other hand, the nut-side sliding clutch 70 constructed as a side face gearing 80, 82 remains closed under axial load and transmits the moment of reaction to the coil spring 104 which then pulls tight and supports the moment of reaction at the right housing part 26. As a result, there is no shortening of the plunger rod adjuster 1 and thus no unintended loss of braking power can occur during a braking operation.

If a fault occurs, in the case of a brake actuator, which generates the braking power of the brake application system, or in its control, which has the result that the brake actuator can no longer release the brake acted upon by the braking power, this brake has to be subjected to an emergency release. For the emergency release of the brake, the electric drive unit 112 is preferably controlled for the emergency and/or auxiliary release from the engineer's cab of the urban railroad or subway. Specifically, the coil spring 104 is rotated in a direction in which it expands. As a result, the previously existing frictional engagement between the free-wheel sleeve 72 and the housing surface 100 is eliminated. Thus, the nut 8 has a free run in this rotating direction. The coil spring 104 can therefore transmit the rotating movement introduced into it by the toothed sleeve 96 to the free-wheel sleeve. This rotation is transmitted to the now freely running nut 8 by slip clutch 70 which is closed because it is not overloaded. As a result, the plunger rod adjuster 1 is shortened and the braking power is reduced. The plunger rod adjuster 1 can thereby be shortened to the minimal length illustrated in FIG. 2 in which the nut 8 on the face side comes in contact with the bottom of the conical sleeve 36 and the final position switches 126 are actuated.

If, for maintenance work, the brake is to be moved into a position in which the brake pads are at a maximal distance from the brake disc, for example, for exchanging the brake pads, an auxiliary release of the brake can also take place by the electric drive unit 112 for the emergency release in the manner described above. The torque is limited which can be transmitted by the nut-side coil spring 104 expanded by the driving torque and is subjected to a bending stress, in the cases in which the helical gear 2 is stiff, for example, because of icing. In this case, the nut 8 is rotated directly for shortening the plunger rod adjuster 1. This takes place in the braking-power-free state by applying a screwing tool to the application surface 68 of the sleeve 66 non-rotatably connected with the nut 8. The nut 8 is manually rotated in a direction in which the plunger rod adjuster 1 is shortened to the minimal length illustrated in FIG. 2. The torque must be so large that the slip clutch 70 arranged between the free-wheel sleeve 72 and the nut 8 can slip, while the coil spring 104 of the coil spring free wheel 74 blocks the free-wheel sleeve 72 in this direction. In this case, the nut 8 is displaced sufficiently away from the free-wheel sleeve 72 in the axial direction that the two side face gearings 80, 82 are disengaged.

The invention is not limited to plunger rod adjusters 1 of brake application systems but can also be used for tie rod adjusters.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A brake application system for vehicles, comprising:
   a wear adjuster including a helical gear having a threaded spindle and a nut which can be screwed to the threaded spindle, the threaded spindle and the nut each being one of two screw connection parts;
   a first of the two screw connection parts of the helical gear being electrically driven to rotate for the wear adjuster; and
   a second of the two screw connection parts of the helical gear being electrically driven to rotate for an emergency and/or auxiliary release of the brake.

2. The brake application system according to claim 1 wherein, for the electric driving of the first screw connection part an electric drive unit is provided which consists of an electric motor with a gearing arranged on an output side, the gearing output of the gearing is rotationally coupled with the first screw connection part.

3. The brake application system according to claim 2, including a clutch in front of the electric drive unit of the first screw connection part, by which clutch, in the event of the presence of an axial force originating from a braking, the first screw connection part is non-rotatably coupled with a non-rotatable part and is otherwise uncoupled from the non-rotatable part.

4. The brake application system according to claim 3, wherein the clutch includes a cone clutch having at least two conical surfaces which can be stopped as a function of friction against one another and are arranged obliquely when viewed in an effective direction of the axial force.

5. The brake application system according to claim 4, wherein one of the conical surfaces is constructed on a housing and the other conical surface is constructed on a conical sleeve non-rotatably connected with the first screw connection part.

6. The brake application system according to claim 5, including a threaded pin of the first screw connection part screwed into an internal thread constructed in a bottom of the conical sleeve.

7. The brake application system according to claim 6, including a gearwheel meshing with a gearing-output-side gearwheel of the gearing and being coaxially rotatably disposed on a cylindrical projection of the conical sleeve.

8. The brake application system according to claim 7, including a slip clutch arranged between the electric drive unit and the first screw connection part; and the slip clutch slips when stop positions have been reached and is otherwise coupling.

9. The brake application system according to claim 8, wherein a first of the stop positions is formed by the application of the brake pads on the brake disc and a second of the stop positions is formed by an end position, in which the first screw connection part is screwed into the second screw connection part to the second of the stop positions or the second screw connection part is screwed into the first screw connection part to the second of the stop positions.

10. The brake application system according to claim 9, wherein the slip clutch is arranged between the cone clutch and the electric drive unit of the first screw connection part.

11. The brake application system according to claim 10, wherein the slip clutch contains balls pretensioned by a defined spring pressure in grooves, the grooves being constructed on a face of the gearing-output-side gearwheel, and the balls being held in bores of a ring non-rotatably held on a cylindrical projection of the conical sleeve.

12. The brake application system according to claim 2, wherein the electric motor comprises a d.c. motor, and the gearing comprises a planetary gearing axially adjoining the d.c. motor as well as one or more gearwheel stages arranged on its output side.

13. The brake application system according to claim 1, wherein at least during the electric driving of the first screw connection part in one rotating direction for the wear adjustment, the second screw connection part is held in a non-rotatable manner.

14. The brake application system according to claim 13, wherein the second screw connection part is coupled with a first electric drive unit for the emergency and/or auxiliary release by a lockable free wheel, and the lockable free wheel permits a rotation of the second screw connection part by the electric drive unit in a direction against wear adjustment and is constructed for blocking this rotation if the rotation is not caused by the electric drive unit.

15. The brake application system according to claim 14, wherein a second electric drive unit of the first screw connection part is actuated independently of the first electric drive unit of the second screw connection part.

16. The brake application system according to claim 14, wherein the first electric drive unit of the second screw connection part contains an electric motor.

17. The brake application system according to claim 14, wherein the second screw connection part is coupled by a slip clutch with the first electric drive unit and has an application surface for the application of a rotating tool.

18. The brake application system according to claim 14, wherein the lockable free wheel is formed as a coil spring free wheel between a cylindrical wall of a non-rotatable part and a sleeve rotating along with the nut.

* * * * *